Patented Mar. 20, 1945

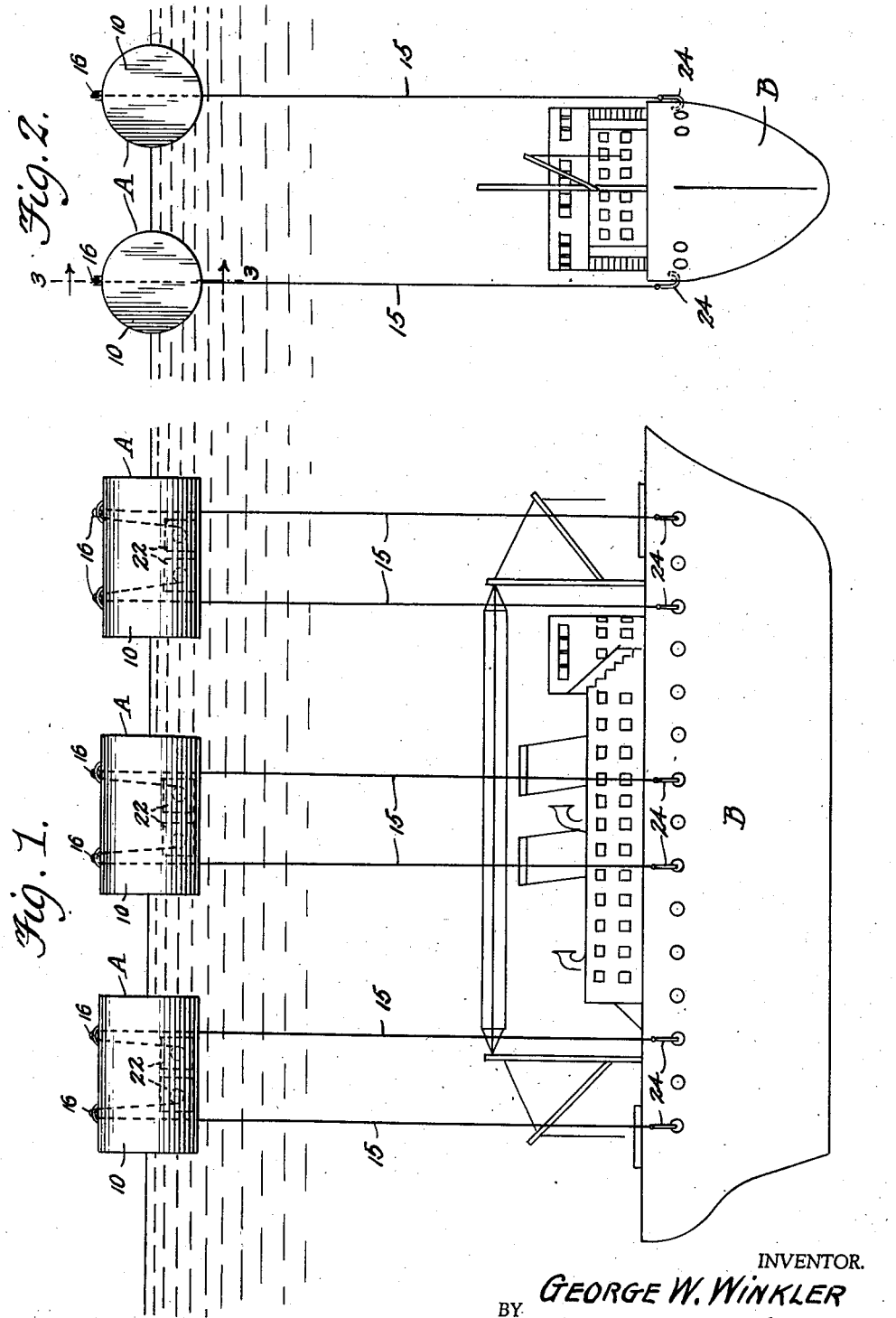
March 20, 1945.  G. W. WINKLER  2,372,039
APPARATUS FOR RAISING SUNKEN VESSELS
Filed May 12, 1944  3 Sheets-Sheet 1
INVENTOR.
GEORGE W. WINKLER
BY Clark + Ott
ATTORNEYS March 20, 1945.  G. W. WINKLER  2,372,039
APPARATUS FOR RAISING SUNKEN VESSELS
Filed May 12, 1944   3 Sheets-Sheet 2
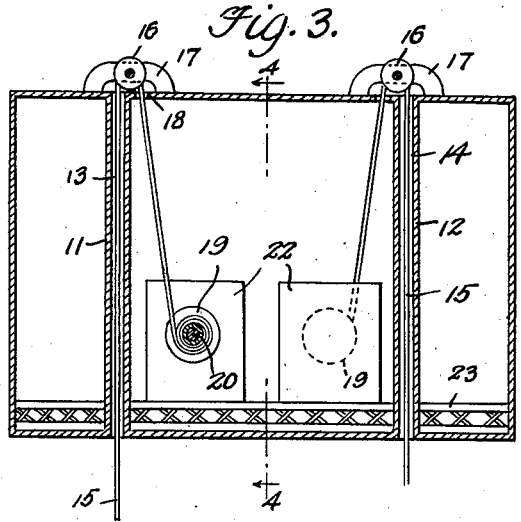
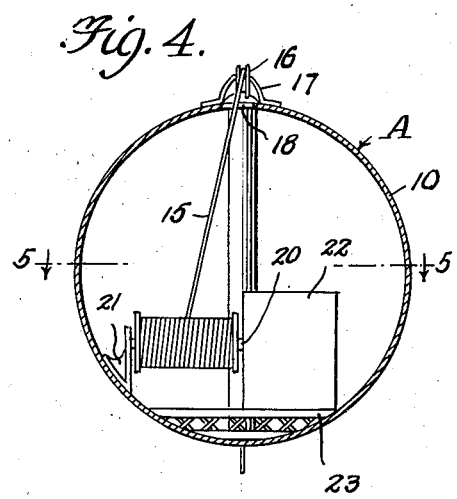
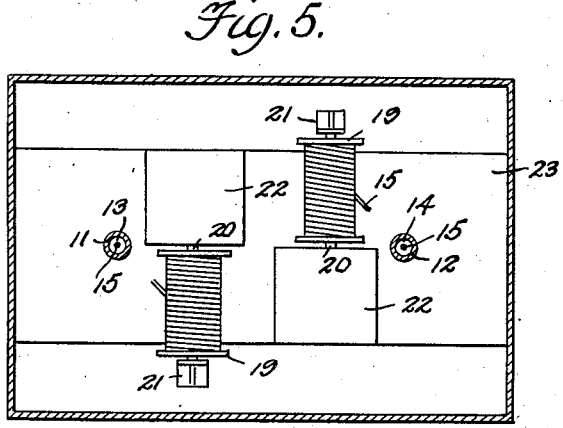
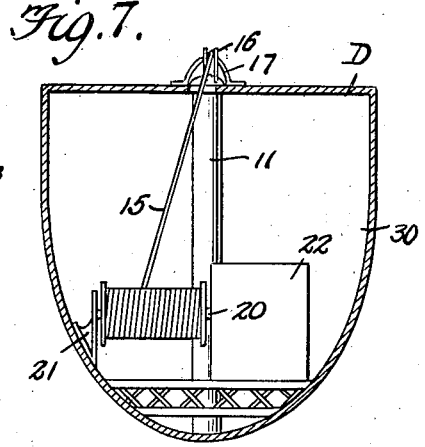
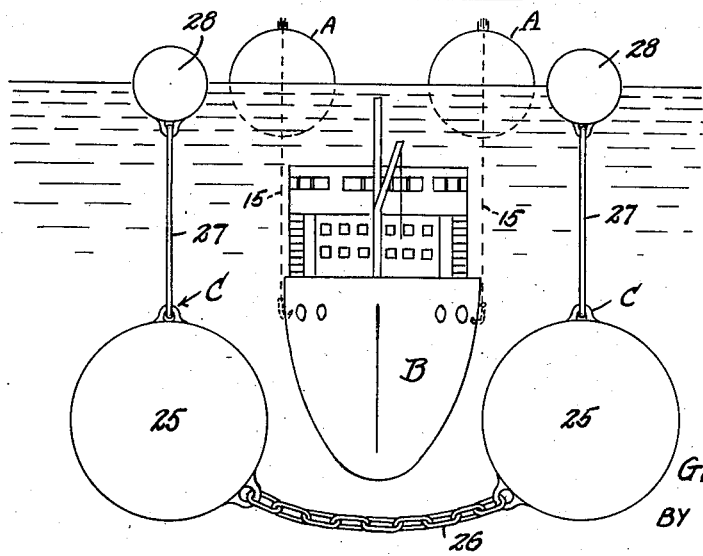
INVENTOR.
GEORGE W. WINKLER
BY Clark & Ott
ATTORNEYS

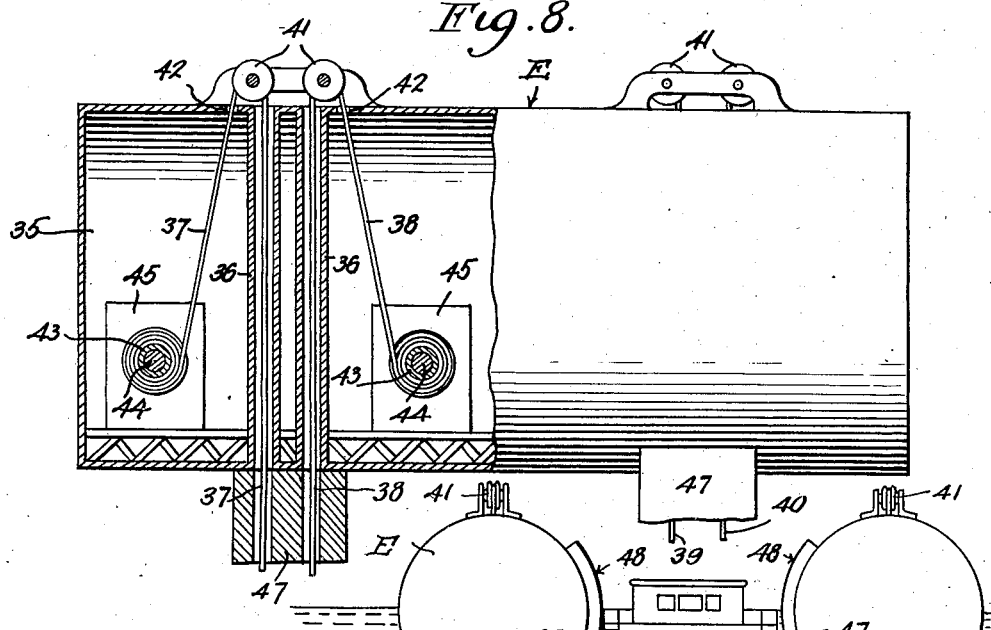
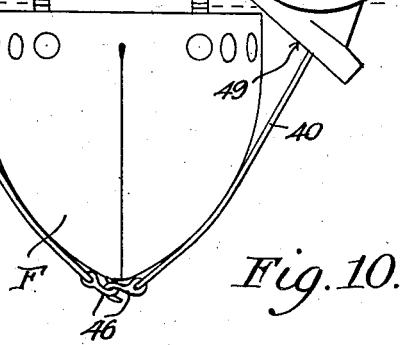
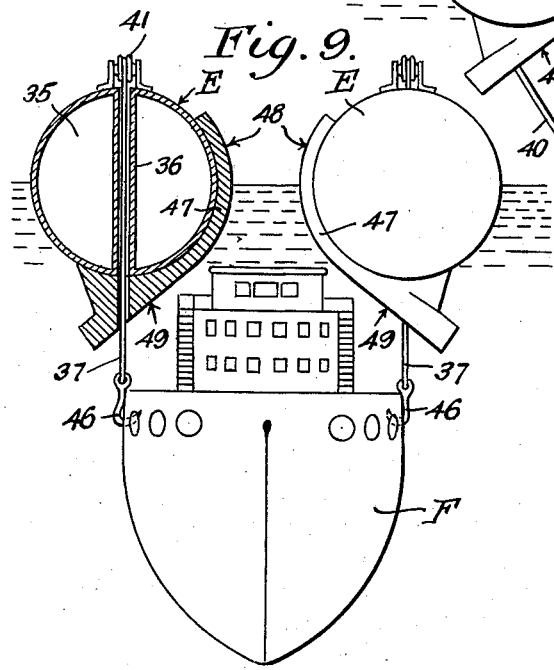

2,372,039

UNITED STATES PATENT OFFICE 2,372,039

APPARATUS FOR RAISING SUNKEN VESSELS

George W. Winkler, Grantwood, N. J.

Application May 12, 1944, Serial No. 535,268

4 Claims. (Cl. 114—51)

This invention relates to an apparatus for raising sunken vessels in order to salvage the same, if possible, and to recover the cargo carried thereby.

This application is in part a substitute for my application, Serial Number 410,365, filed September 11, 1941, now abandoned.

The invention aims primarily to provide an improved buoyantly supported hoisting apparatus for initially raising the vessel from the bed or bottom of the body of water to a partially raised location disposed within convenient reach of the surface so as to facilitate access thereto in order to effect the final raising of the vessel to the surface for the purpose of towing the same to shallow water.

The invention also comprehends improved hoisting apparatus for accomplishing a two stage method of raising a sunken vessel which permits of the initial raising of the same to a location near the surface and the subsequent final raising of the same to the surface and support thereof in a sling arrangement for facilitating towing the same to shallow water.

More particularly, the invention comprehends in one of its adaptations surface craft members for hoisting a sunken vessel which members are equipped with bumper guard means so constructed and arranged in such a manner as to permit of the raising of the sunken vessel completely to the surface of the water for disposition of the same between a multiplicity of pairs of said surface craft members with the hoisting cables arranged to extend under the vessel from the surface craft on one side thereof to those on the opposite side.

With the above enumerated and other objects in view, the invention is set forth in greater detail in the following specification and illustrated in the accompanying drawings in which:

Fig. 1 is a side view of a sunken vessel with the buoyant hoisting apparatus connected therewith.

Fig. 2 is an end view thereof.

Fig. 3 is an enlarged vertical longitudinal sectional view through one of the buoyant surface craft taken approximately on the line 3—3 of Fig. 2.

Fig. 4 is a transverse sectional view therethrough taken approximately on the line 4—4 of Fig. 3.

Fig. 5 is a horiozntal sectional view taken approximately on the line 5—5 of Fig. 4.

Fig. 6 is an end view of a sling coupled pontoon unit immediately prior to engagement with the vessel for effecting final raising of the same to the surface.

Fig. 7 is a transverse sectional view similar to Fig. 4, illustrating a modified form of hoisting craft.

Fig. 8 is an enlarged side view of a modified form of buoyant surface craft with parts broken away and shown in section.

Fig. 9 is a diagrammatic view illustrating the manner in which the initial raising is accomplished with the modified type of craft.

Fig. 10 is a similar view illustrating the final stage of raising and supporting the vessel.

Referring to the drawings by characters of reference, the surface hoisting craft or members A, as illustrated in Figs. 1 to 5 inclusive, are disclosed as consisting of a hollow cylindrical body 10 having a pair of vertical tubes 11 and 12 which are spaced longitudinally of the craft or member A, are disposed centrally thereof in alignment with each other, and which open respectively through the top and bottom of the craft at diametrically opposite points to provide passageways 13 and 14.

A hoisting cable, chain, rope or other equivalent flexible element 15 extends upwardly through each of the passageways 13 and is trained around a sheave 16 journaled in a bearing 17 supported over the upper end of the passageway. The cable 15 then extends downwardly from the sheave 16 through the openings 18 in the top of the craft 10 and is secured to a hoisting drum 19 mounted on a transverse horizontal shaft 20 journaled at one end in a bearing 21 and connected at its opposite end with a suitable motor, engine or other equivalent prime mover 22, it being understood that a separate motor or prime mover is employed for each drum and that the drums and motors are located adjacent the bottom of the craft or buoyant surface member 10 so as to properly balance the same and maintain it in a substantially upright position upon the surface.

As illustrated, the motors or prime movers 22 are supported upon a platform 23 within the bottom of the craft 10 and in order to equalize the lifting or hoisting strain, the motors and their drums are reversely arranged in the manner illustrated in Fig. 5 of the drawings, with one motor on one side of the longitudinal center and its hoisting drum on the opposite side, while the other motor is on the opposite side of the longitudinal center from that of the first motor and with the drum and said latter motor on the opposite side of the first mentioned hoisting drum.

Each hoisting cable is provided at its lower end with an anchoring means, such as a hook 24, grapple or other equivalent device for attaching the same to the sunken vessel indicated at B.

In practice, a number of buoyant surface members or craft A are employed and divers are sent down to attach the hoisting cables 15 of one set of members 10, to one side of the vessel and those of an equal number of members 10 to the opposite side of the vessel in the manner illustrated in Figs. 1 and 2 of the drawings, it being understood that the hoisting cables are attached at longitudinally spaced points along the sides of the sunken vessel. The motors 22 of the various drums are then started to exert an upward pull on said cables by the winding of the same upon the hoisting drums until the sunken vessel is freed from the bed or bottom and then the motors are individually driven to trim the vessel fore and aft and laterally as it is raised to dispose the same in a location adjacent to and within convenient reach of the surface.

In order to effect the final lifting and support of the vessel for towing to shallow water, a plurality of sling coupled pontoon units, designated generally by the reference character C, are employed, each of which, as illustrated in Fig. 6, consists of a pair of hollow cylindrical tanks 25 which are coupled together by slings 26. The pontoon tanks 25 are individually connected by chains, cables or flexible elements 27 to suspension floats 28 of sufficient buoyancy to support the pontoon tanks 25 in suspended relation below the surface to maneuver the same to a position where the slings 26 will straddle the hull of the sunken vessel B transversely with the pontoon tanks 25 disposed at opposite sides of the hull. The tanks may initially contain a predetermined amount of water which after the unit is disposed in straddling relation to the hull, is pumped out so that the pontoon tanks will rise to or adjacent the surface for effecting the final raising of the sunken vessel to the surface where the pontoon tanks then function as means for supporting the vessel for towing the same to shallow water.

From the foregoing it will thus be seen that apparatus has been devised by virtue of which a two stage method of raising a sunken vessel may be carried out which essentially consists in first attaching a plurality of flexible hoisting elements respectively to longitudinal spaced points at opposite sides of the sunken vessel and then exerting an upward pull on said elements to partially raise the vessel and dispose the same in a location adjacent the surface whereby convenient access may be had thereto from the surface. A plurality of pairs of submerged pontoon tanks connected by slings are then buoyantly suspended from surface floats and maneuvered into position where the slings transversely straddle the partially raised vessel after which the pontoon tanks are pumped out to raise the vessel to the surface and to support the same for towing to shallow water.

In the modified form of the invention illustrated in Figs. 7 of the drawings, the surface hoisting craft or member D is illustrated as consisting of a hollow body member 30 which is of cross sectional shape corresponding to the hull of a ship. In this instance, the same is equipped with the vertical tubes 11 defining the passageways through which the hoisting cables 15 extend and is provided with hoisting drums and motors or engines, as in the previous form of the invention.

In the form of the invention shown in Figs. 8, 9 and 10, the surface craft members E are substantially identical with the members A with the exception that in this instance the hollow cylindrical body or hull 35 of each of the members is provided with four vertically disposed tubes 36 arranged in longitudinally spaced relation with each tube opening through the top and bottom of the body at diametrically opposite points so that each defines a closed passageway sealed off from the interior of the body.

Flexible hoisting elements 37, 38, 39, and 40 such as chains, cables or the like extend respectively upward through the tubes 36 and each is trained around a sheave 41 and thence downward through an opening 42 in the top of the body and secured to a drum 43 mounted on the shaft 44 of a hoisting engine 45 supported in the lower portion of the hull or body 10.

The opposite end of each hoisting element has secured thereto an anchoring means such as a hook, grapple or equivalent device 46 for attaching the same, the sunken vessel indicated in this instance by the reference character F.

In order to permit of the raising of the sunken vessel F to a height where a portion thereof may be disposed above the surface of the water to facilitate the towing of the same, each of the surface craft members E has secured to the exterior thereof bumper guards 47 which, as shown, are so constructed as to provide upper convex surface portions 48 which merge into downwardly and laterally inclined lower surface portions 49, the purpose of which will be hereafter set forth.

In use, the surface craft members E are arranged in pairs with the bumper guards 47 disposed in confronting relation so that after one pair of hoisting elements of each of the members, for instance the elements 37 and 39, have been attached to the opposite sides of the vessel F by divers and the said vessel raised to the position shown in Fig. 9, where it is near the surface of the water, the remaining pair of hoisting elements 38 and 40 of each member E are passed under the vessel F and the hooks 46 of corresponding elements from oppositely disposed members are hooked together as shown in Fig. 10. The other pair of elements 37 and 39 may then be slacked off and the hooks 46 removed from their initial engagement with the sides of the vessel and then said elements passed under the same and the hooks of elements 37 and 39 engaged with the hooks of the corresponding elements of the oppositely disposed members in the same manner as the hooks of the elements 38 and 40. All of the flexible hoisting elements of all of the surface craft members E may then be wound upon the drums 43 to hoist the vessel F to the desired height, it being apparent from Fig. 10 that the sides of the vessel will engage with the inclined surface portions 49 of the bumper guards 47 to cam the surface craft members E apart.

What is claimed is:

1. In an apparatus for raising and salvaging sunken vessels, a hollow buoyant surface craft having a pair of spaced vertical tubular members sealed off from the interior of the craft and defining passages opening respectively through the top and bottom of the craft, hoisting drums located within said craft adjacent the bottom thereof, flexible hoisting elements secured respectively to said drums for winding and unwinding thereupon, said flexible hoisting elements respectively extending upwardly from the drums through the top of the craft and thence trained downwardly through said tubular members for connection at their free lower ends with the sunken vessel.

2. In an apparatus for raising and salvaging sunken vessels, a hollow buoyant surface craft, a pair of vertical tubes sealed off from the interior of the craft and opening respectively through the top and bottom of the craft and arranged in aligned spaced relation longitudinally thereof at the transverse center, hoisting drums located within said craft adjacent the bottom thereof, flexible hoisting elements respectively extending upwardly from and secured to the drums for winding and unwinding thereupon, said hoisting elements extending through the top of the craft and thence trained downwardly through said tubes respectively for connection at their lower free ends with the sunken vessel.

3. In an apparatus for raising and salvaging sunken vessels, a hollow buoyant surface craft, a pair of vertical tubes sealed off from the interior of the craft and opening respectively through the top and bottom of the craft and arranged in aligned spaced relation longitudinally and at the transverse center thereof, motor driven hoisting drums within said craft adjacent the bottom thereof and disposed in reversely arranged relation with one drum on one side of the longitudinal center of the craft and the other drum on the opposite side of said longitudinal center, flexible hoisting elements secured respectively to said drums and adapted to be wound upon and unwound therefrom, said flexible hoisting elements respectively extending upwardly from the drums through the top of the craft and thence trained downwardly through said tubes, and means at the lower free ends of said flexible hoisting elements adapted for attachment to the sunken vessel.

4. In an apparatus for raising and salvaging sunken vessels, a hollow buoyant surface craft having a plurality of pairs of longitudinally spaced vertical tubular members sealed off from the interior of the craft and defining passages opening respectively through the top and bottom of said craft, hoisting drums located within said craft adjacent the bottom thereof, flexible hoisting elements secured respectively to said drums for winding and unwinding thereupon, said flexible hoisting elements respectively extending from the drums through the top of the craft and thence trained downwardly through the respective tubular members for connection at their free lower ends to the sunken vessel, and longitudinally spaced exterior bumper guards secured to and extending vertically along one side and the lower portion of said craft, said bumper guards each having a convex upper surface along the side portion of the craft and having an inclined surface extending downwardly and laterally therefrom along the lower portion of said craft.

GEORGE W. WINKLER.